(12) United States Patent
Inoue et al.

(10) Patent No.: US 12,269,492 B2
(45) Date of Patent: Apr. 8, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Daichi Inoue, Wako (JP); Sho Tamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 204 days.

(21) Appl. No.: 18/109,895

(22) Filed: Feb. 15, 2023

(65) Prior Publication Data
US 2023/0303099 A1    Sep. 28, 2023

(30) Foreign Application Priority Data
Mar. 22, 2022 (JP) ................. 2022-045425

(51) Int. Cl.
*B60W 50/08* (2020.01)
*B60W 10/04* (2006.01)
*B60W 10/20* (2006.01)
*B60W 60/00* (2020.01)

(52) U.S. Cl.
CPC .......... *B60W 50/082* (2013.01); *B60W 10/04* (2013.01); *B60W 10/20* (2013.01);
(Continued)

(58) Field of Classification Search
CPC ................. B60W 10/04; B60W 10/20; B60W 2420/403; B60W 2520/10;
(Continued)

(56) References Cited

U.S. PATENT DOCUMENTS 11,827,246 B2 *  11/2023  Tamura ............. B60W 60/0055
12,030,530 B2 *  7/2024  Tamura ............. B60W 60/0057
(Continued)

FOREIGN PATENT DOCUMENTS

JP    2019-038289    3/2019
JP    2020-050086    4/2020
(Continued)

OTHER PUBLICATIONS

Japanese Notice of Allowance for Japanese Patent Application No. 2022-045425 mailed Oct. 10, 2023.

*Primary Examiner* — Yufeng Zhang
(74) *Attorney, Agent, or Firm* — Amin, Turocy & Watson, LLP

(57) ABSTRACT

A vehicle control device is configured to acquire a camera image obtained by capturing an image, control steering and acceleration or deceleration of the vehicle without depending on an operation of a driver of the vehicle on the basis of the camera image and map information, decide a driving mode of the vehicle as any one of a plurality of driving modes including a first driving mode and a second driving mode, change the driving mode of the vehicle to a driving mode with a heavier task when a task related to the decided driving mode is not executed by the driver, determine whether there is a deviation between a road division line shown in the camera image and a road division line shown in the map information, determine whether a preceding vehicle is present in front of the vehicle when it is determined that there is a deviation.

8 Claims, 6 Drawing Sheets

(52) U.S. Cl.
CPC ..... *B60W 60/005* (2020.02); *B60W 2420/403* (2013.01); *B60W 2520/10* (2013.01); *B60W 2552/05* (2020.02); *B60W 2552/53* (2020.02); *B60W 2554/4041* (2020.02); *B60W 2554/802* (2020.02); *B60W 2556/40* (2020.02); *B60W 2710/20* (2013.01); *B60W 2720/106* (2013.01)

(58) Field of Classification Search
CPC ......... B60W 2552/05; B60W 2552/30; B60W 2552/53; B60W 2554/4041; B60W 2554/802; B60W 2556/40; B60W 2710/20; B60W 2720/106; B60W 50/082; B60W 60/005
See application file for complete search history.

(56) References Cited

U.S. PATENT DOCUMENTS

| | | | |
|---|---|---|---|
| 2017/0122749 A1* | 5/2017 | Urano | G01S 19/42 |
| 2019/0138002 A1 | 5/2019 | Mimura et al. | |
| 2019/0258249 A1* | 8/2019 | Kim | G06F 16/29 |
| 2022/0067398 A1 | 3/2022 | Tamura et al. | |
| 2022/0219692 A1 | 7/2022 | Taniguchi | |

FOREIGN PATENT DOCUMENTS

| | | |
|---|---|---|
| JP | 2022-039951 | 3/2022 |
| WO | 2017/187622 | 11/2017 |
| WO | 2020/230551 | 11/2020 |
| WO | 2021/033312 | 2/2021 |

* cited by examiner

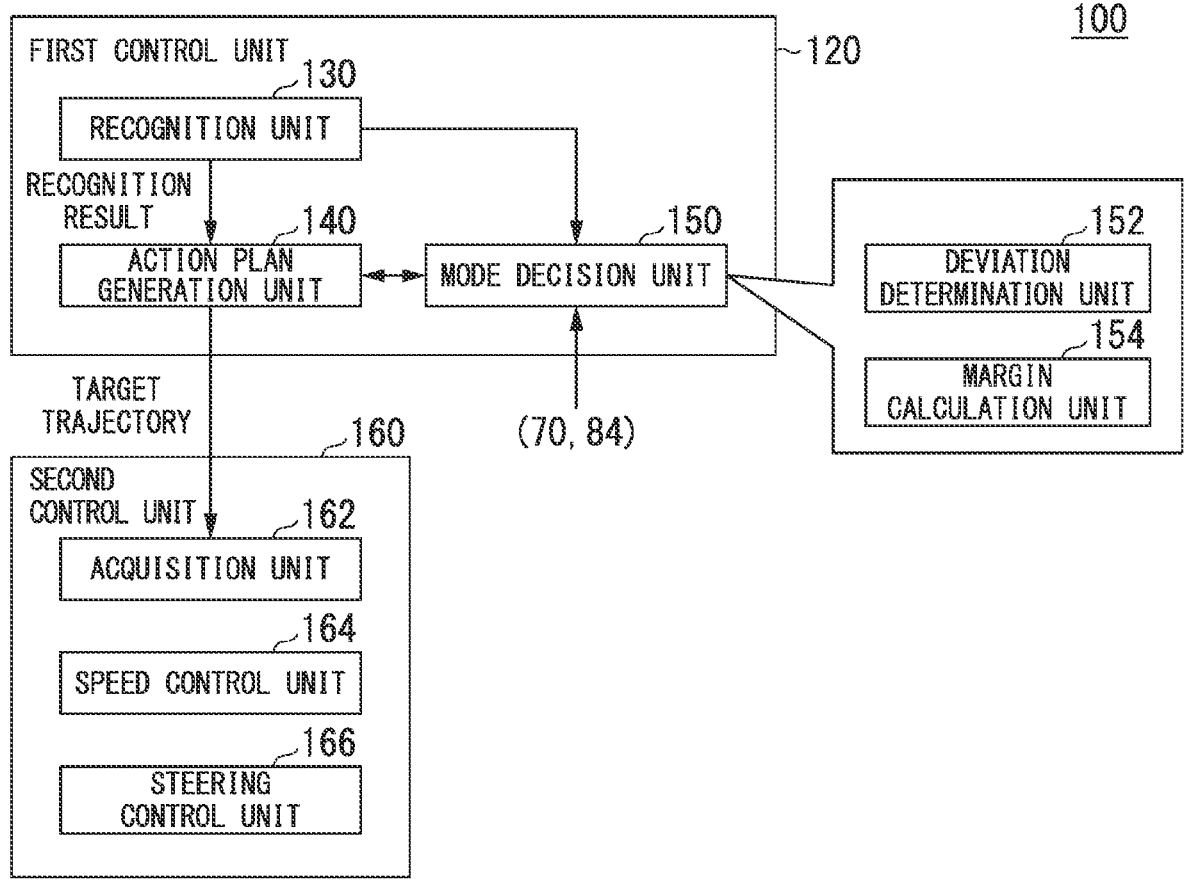

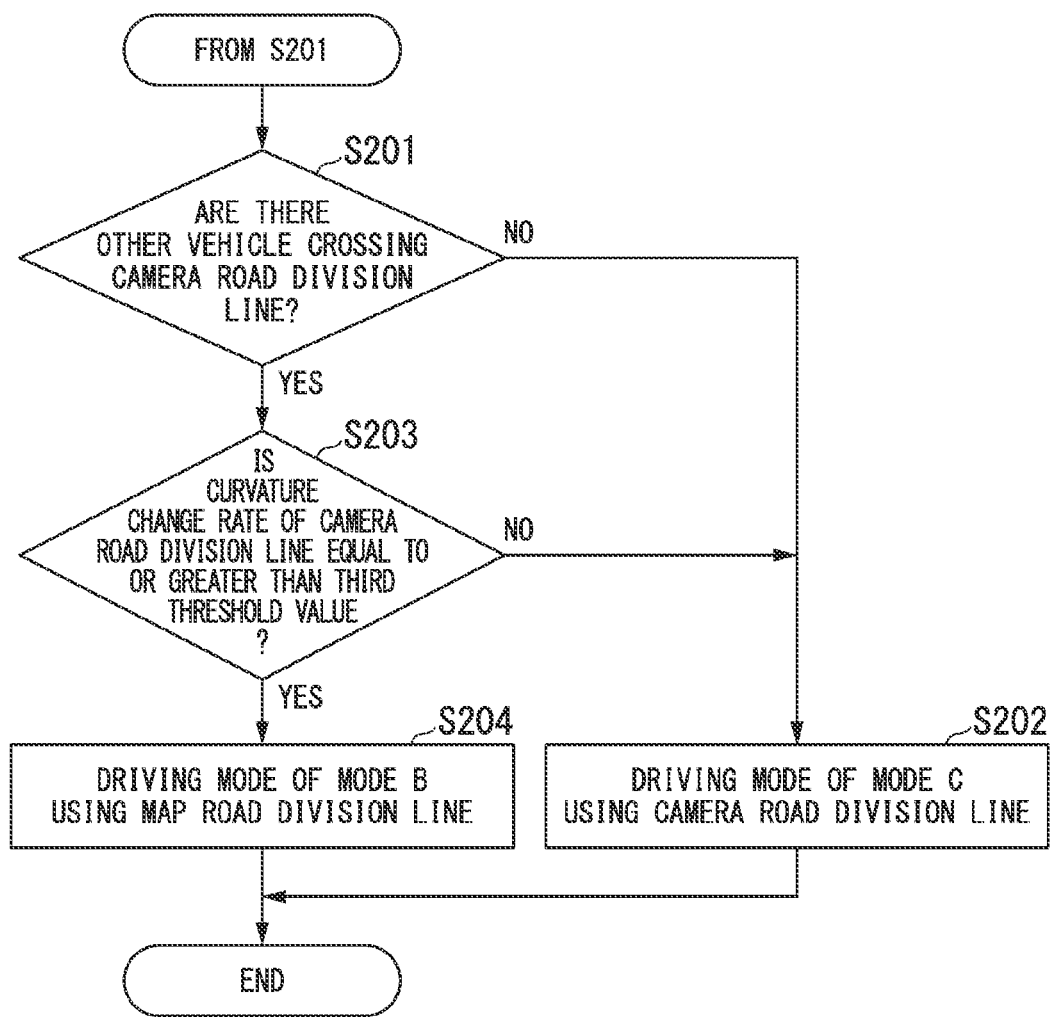

VEHICLE CONTROL DEVICE, VEHICLE CONTROL METHOD, AND STORAGE MEDIUM

BACKGROUND OF THE INVENTION

Field of the Invention

The present invention relates to a vehicle control device, a vehicle control method, and a storage medium.

Description of Related Art

Conventionally, technologies for controlling traveling of a vehicle on the basis of a road division line recognized by a camera mounted in the vehicle are known. For example, Japanese Unexamined Patent Application, First Publication No. 2020-050086 discloses a technology of causing a host vehicle to travel on the basis of a recognized road division line, and causing the host vehicle to travel on the basis of a trajectory of a preceding vehicle when a degree of recognition of a road division line does not satisfy a predetermined reference.

The technology disclosed in Patent Document 1 controls the traveling of the host vehicle on the basis of a road division line recognized by a camera and map information mounted in the host vehicle. However, in the conventional technology, when the road division line recognized by the camera and content of the map information mounted in the host vehicle are different, there may be cases in which it is not possible to flexibly change driving control of a vehicle.

SUMMARY OF THE INVENTION

The present invention has been made in view of such circumstances, and an object thereof is to provide a vehicle control device, a vehicle control method, and a storage medium that can flexibly change driving control of a vehicle even when a road division line recognized by a camera differs from content of map information mounted in a host vehicle.

The vehicle control device, the vehicle control method, and the storage medium according to the present invention have adopted the following configuration.

(1): A vehicle control device according to one aspect of the present invention includes a storage medium configured to store a computer-readable instruction, and a processor connected to the storage medium, in which the processor executes the computer-readable instruction, thereby acquiring a camera image obtained by capturing an image of a surrounding situation of a vehicle, controlling steering and acceleration or deceleration of the vehicle without depending on an operation of a driver of the vehicle on the basis of the camera image and map information, deciding a driving mode of the vehicle as any one of a plurality of driving modes including a first driving mode and a second driving mode, and changing the driving mode of the vehicle to a driving mode with a heavier task when a task related to the decided driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of a driver of the vehicle, determining whether there is a deviation between a road division line shown in the camera image and a road division line shown in the map information, determining whether a preceding vehicle is present in front of the vehicle when it is determined that there is a deviation, causing the vehicle to continue traveling in the second driving mode using the road division line shown in the camera image when it is determined that the preceding vehicle is present, and a degree of interference between a road division line shown in the camera image and the preceding vehicle is equal to or less than a first threshold value, and changing the second driving mode to the first driving mode using the road division line shown in the camera image when it is determined that the preceding vehicle is not present.

(2): In the aspect of (1) described above, the processor may calculate a degree of margin for the vehicle to continue traveling in the second driving mode as the degree of interference on the basis of a distance from the vehicle to the preceding vehicle, a distance from the preceding vehicle to an intersection of the preceding vehicle with a road division line shown in the camera image, and a speed of the vehicle.

(3): In the aspect of (1) described above, the processor may determine whether a deviation between a road division line shown in the camera image and a road division line shown in the map information is equal to or less than a second threshold value when it is determined that the preceding vehicle is present and the degree of interference is equal to or less than the first threshold value, and the processor may change the second driving mode using a road division line shown in the camera image to the first driving mode using a road division line shown in the camera image when it is determined that the deviation is greater than the second threshold value.

(4): In the aspect of (1) described above, the processor may change the second driving mode using a road division line shown in the camera image to the first driving mode using a road division line shown in the camera image when it is determined that the preceding vehicle is present and the degree of interference is greater than the first threshold value.

(5): In the aspect of (1) described above, the processor may determine whether there are other vehicles crossing a road division line shown in the camera image when it is determined that the preceding vehicle is not present, and determines whether a curvature change rate of a road division line shown in the camera image is equal to or greater than a third threshold value when it is determined that there are other vehicles, and the processor may change the second driving mode using a road division line shown in the camera image to the second driving mode using a road division line shown in the map information when it is determined that the curvature change rate is equal to or greater than the third threshold value.

(6): In the aspect of (1) described above, the second driving mode may be a driving mode in which a task of gripping an operator for receiving a steering operation of the vehicle is not imposed on the driver, and the first driving mode may be a driving mode in which at least only the task of gripping the operator is imposed on the driver.

(7): A vehicle control method according to another aspect of the present invention includes, by a computer, acquiring a camera image obtained by capturing an image of a surrounding situation of a vehicle, controlling steering and acceleration or deceleration of the vehicle without depending on an operation of a driver of the vehicle on the basis of the camera image and map information, deciding a driving mode of the vehicle as any one of a plurality of driving modes including a first driving mode and a second driving mode, and changing the driving mode of the vehicle to a driving mode with a heavier task when a task related to the decided driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of a driver of the vehicle, determining whether there is a deviation between a road division line shown in the camera image and a road division line shown in the map information, determining whether a preceding vehicle is present in front of the vehicle when it is determined that there is a deviation, and causing the vehicle to continue traveling in the second driving mode using the road division line shown in the camera image when it is determined that the preceding vehicle is present, and a degree of interference between a road division line shown in the camera image and the preceding vehicle is equal to or less than a first threshold value, and changing the second driving mode to the first driving mode using the road division line shown in the camera image when it is determined that the preceding vehicle is not present.

(8): A non-transitory computer-readable storage medium according to still another aspect of the present invention stores a program which causes a computer to execute acquiring a camera image obtained by capturing an image of a surrounding situation of a vehicle, controlling steering and acceleration or deceleration of the vehicle without depending on an operation of a driver of the vehicle on the basis of the camera image and map information, deciding a driving mode of the vehicle as any one of a plurality of driving modes including a first driving mode and a second driving mode, and changing the driving mode of the vehicle to a driving mode with a heavier task when a task related to the decided driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of a driver of the vehicle, determining whether there is a deviation between a road division line shown in the camera image and a road division line shown in the map information, determining whether a preceding vehicle is present in front of the vehicle when it is determined that there is a deviation, and causing the vehicle to continue traveling in the second driving mode using the road division line shown in the camera image when it is determined that the preceding vehicle is present, and a degree of interference between a road division line shown in the camera image and the preceding vehicle is equal to or less than a first threshold value, and changing the second driving mode to the first driving mode using the road division line shown in the camera image when it is determined that the preceding vehicle is not present.

According to (1) to (8), even when a road division line recognized by a camera differs from content of map information installed in the host vehicle, it is possible to flexibly change driving control of a vehicle.

BRIEF DESCRIPTION OF THE DRAWINGS

FIG. 2 is a functional configuration diagram of a first control unit and a second control unit.

FIG. 3 is a diagram which shows an example of correspondences between a driving mode, a control state of a host vehicle M, and a task.

FIG. 8 is a flowchart which shows an example of the flow of operations executed by the vehicle control device according to the embodiment.

DETAILED DESCRIPTION OF THE INVENTION

Hereinafter, embodiments of a vehicle control device, a vehicle control method, and a storage medium of the present invention will be described with reference to the drawings.
[Overall Configuration]

Figure 1:
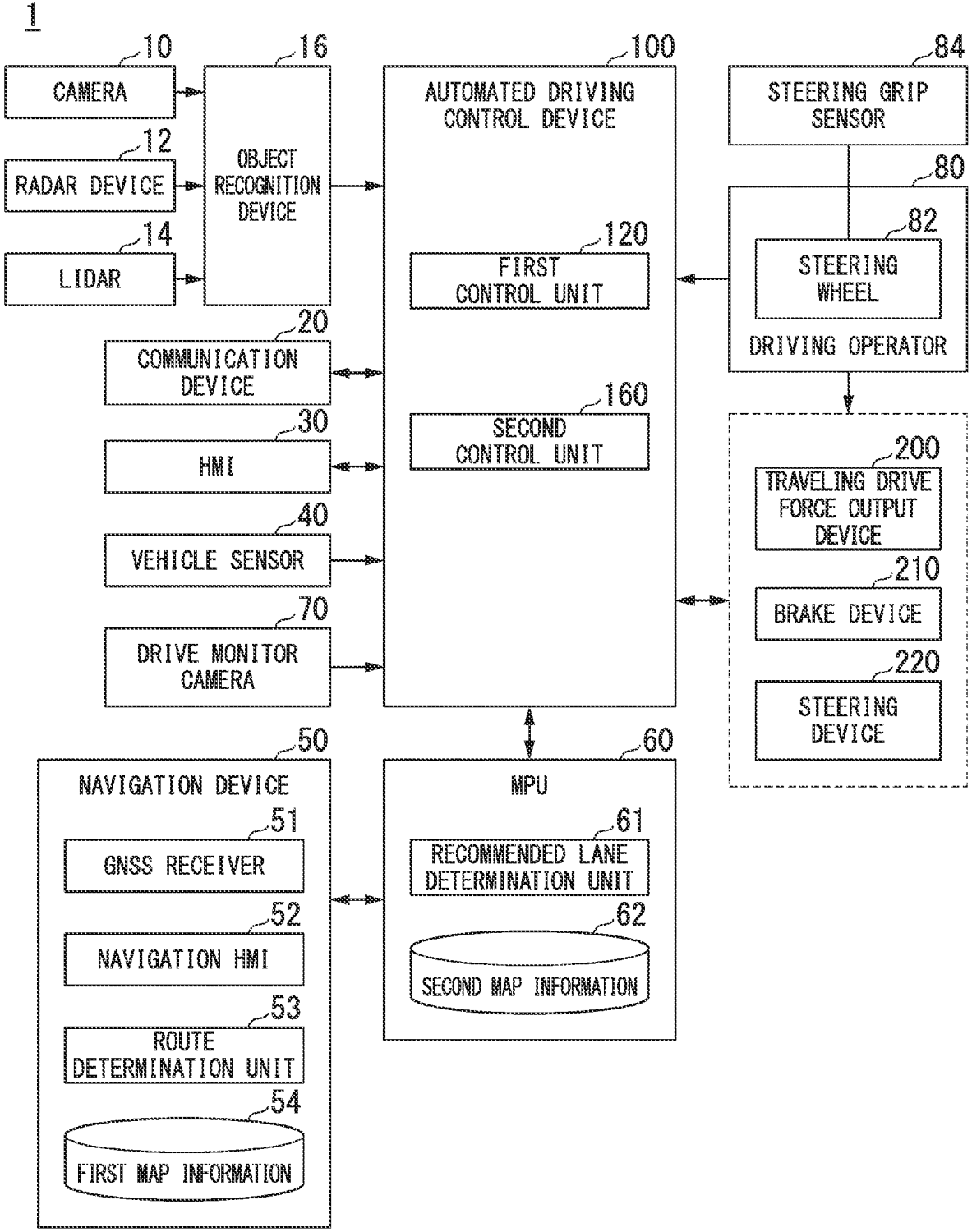
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a drive monitor camera 70, a driving operator 80, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as a host vehicle M). When an image of the front is captured, the camera 10 is attached to an upper part of the front windshield, a back surface of the windshield rear-view mirror, and the like. The camera 10 periodically and repeatedly captures, for example, a periphery of the host vehicle M. The camera 10 may be a stereo camera.

The radar device 12 radiates radio waves such as millimeter waves to the periphery of the host vehicle M, and also detects at least a position (a distance and an orientation) of an object by detecting radio waves (reflected waves)

reflected by the object. The radar device 12 is attached to an arbitrary place on the host vehicle M. The radar device 12 may detect the position and speed of an object in a frequency modulated continuous wave (FM-CW) method.

The LIDAR 14 irradiates the periphery of the host vehicle M with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the host vehicle M.

The object recognition device 16 performs sensor fusion processing on a result of detection by some or all of the camera 10, the radar device 12, and the LIDAR 14, and recognizes the position, type, speed, and the like of an object. The object recognition device 16 outputs a result of recognition to the automated driving control device 100. The object recognition device 16 may output the results of detection by the camera 10, the radar device 12, and the LIDAR 14 to the automated driving control device 100 as they are. The object recognition device 16 may be omitted from the vehicle system 1.

The communication device 20 communicates with other vehicles present in the periphery of the host vehicle M by using, for example, a cellular network, a Wi-Fi network, Bluetooth (a registered trademark), dedicated short range communication (DSRC), or the like, or communicates with various server devices via a wireless base station.

The HMI 30 presents various types of information to an occupant of the host vehicle M and receives an input operation by the occupant. The HMI 30 includes various display devices, a speaker, a buzzer, a touch panel, a switch, a key, and the like.

The vehicle sensor 40 includes a vehicle speed sensor that detects a speed of the host vehicle M, an acceleration sensor that detects acceleration, a yaw rate sensor that detects an angular speed around a vertical axis, an azimuth sensor that detects a direction of the host vehicle M, and the like.

The navigation device 50 includes, for example, a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determination unit 53 determines, for example, a route from the position of the host vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like. A route on a map is output to the MPU 60. The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determination unit 61, and holds second map information 62 in a storage device such as an HDD or a flash memory. The recommended lane determination unit 61 divides the route on a map provided from the navigation device 50 into a plurality of blocks (for example, divides every 100 [m] in a vehicle traveling direction), and determines a recommended lane for each block with reference to the second map information 62. The recommended lane determination unit 61 determines which numbered lane from the left to drive. When a branch place is present on the route on a map, the recommended lane determination unit 61 determines a recommended lane so that the host vehicle M can travel on a reasonable route to proceed to the branch destination.

The second map information 62 is map information with higher accuracy than the first map information 54. The second map information 62 includes, for example, information on a center of a lane, information on a boundary of the lane, and the like. In addition, the second map information 62 may include road information, traffic regulation information, address information (addresses/zip codes), facility information, telephone number information, information on a prohibited section in which a mode A or a mode B is prohibited, which will be described below, and the like. The second map information 62 may be updated at any time by the communication device 20 communicating with another device.

The drive monitor camera 70 is, for example, a digital camera using a solid-state imaging device such as CCD or CMOS. For example, the drive monitor camera 70 is attached at any place on the host vehicle M, which is a position and a direction at which the head of an occupant (hereafter referred to as a driver) seated in a driver's seat of the host vehicle M can be imaged from the front (in a direction for imaging the face). For example, the drive monitor camera 70 is attached to an upper portion of a display device provided in a center portion of an instrument panel of the host vehicle M.

The driving operator 80 includes, for example, in addition to the steering wheel 82, an accelerator pedal, a brake pedal, a shift lever, and other operators. The driving operator 80 has a sensor that detects the amount of operation or a presence or absence of an operation attached thereto, and a result of detection is output to the automated driving control device 100, or some or all of the traveling drive force output device 200, the brake device 210, and the steering device 220. The steering wheel 82 is an example of an "operator that receives a steering operation from a driver." The operator does not necessarily have to be circular, and may be in a form of a deformed steering wheel, a joystick, a button, or the like. A steering grip sensor 84 is attached to the steering wheel 82. The steering grip sensor 84 is realized by an electrostatic capacitance sensor or the like, and outputs a signal capable of detecting whether the driver is gripping the steering wheel 82 (being in a contact in a state where force is applied) to the automated driving control device 100.

The automated driving control device 100 includes, for example, a first control unit 120, and a second control unit 160. The first control unit 120 and the second control unit 160 are realized by, for example, a hardware processor such as a central processing unit (CPU) executing a program (software), respectively. In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to a drive device. The automated driving control device 100 is an example of the "vehicle control device," and a combination of the action plan generation unit 140 and the second control unit 160 is an example of a "driving controller."

FIG. 2 is a functional configuration diagram of the first control unit 120 and the second control unit 160. The first control unit 120 includes, for example, the recognition unit 130, the action plan generation unit 140, and a mode decision unit 150. The first control unit 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for pattern matching, a road sign, or the like) in parallel, and scoring and comprehensively evaluating the both. As a result, reliability of automated driving is ensured.

The recognition unit 130 recognizes the position of an object in the periphery of the host vehicle M and states such as a speed and acceleration thereof on the basis of information input from the camera 10, the radar device 12, and the LIDAR 14 via the object recognition device 16. The position of an object is recognized as, for example, a position on absolute coordinates with a representative point (a center of gravity, a center of a drive axis, or the like) of the host vehicle M as an origin, and is used for control. The position of an object may be represented by a representative point such as the center of gravity or a corner of the object, or may be represented by an area. The "states" of an object may include the acceleration or jerk of the object, or a "behavioral state" (for example, whether a lane is being changed or is about to be changed).

In addition, the recognition unit 130 recognizes, for example, a lane (a traveling lane) in which the host vehicle M is traveling. For example, the recognition unit 130 recognizes a traveling lane by comparing a pattern of road division line (for example, an array of solid lines and broken lines) obtained from the second map information 62 with a pattern of road division line in the periphery of the host vehicle M recognized from an image captured by the camera 10. The recognition unit 130 may also recognize a traveling lane by recognizing not only the road division line but also road boundaries including the road division line, a road shoulder, a curb, a median strip, a guardrail, and the like. In this recognition, the position of the host vehicle M acquired from the navigation device 50 and a result of processing by the INS may be taken into account. In addition, the recognition unit 130 recognizes stop lines, obstacles, red lights, tollhouses, and other road events.

The recognition unit 130 recognizes the position and posture of the host vehicle M with respect to a traveling lane when a traveling lane is recognized. The recognition unit 130 may recognize, for example, a deviation of a reference point of the host vehicle M from a center of the lane and an angle of the host vehicle M, formed with respect to a line connecting the centers of the lane in the traveling direction, as a relative position and the posture of the host vehicle M with respect to the traveling lane. Instead, the recognition unit 130 may recognize the position or the like of the reference point of the host vehicle M with respect to any side end (a road division line or road boundary) of the traveling lane as the relative position of the host vehicle M with respect to the traveling lane. The recognition unit 130 is an example of an "acquisition unit."

In principle, the action plan generation unit 140 travels in a recommended lane determined by the recommended lane determination unit 61, and furthermore, generates a target trajectory on which the host vehicle M will automatically travel (without depending on an operation of a driver) in the future to be able to respond to the peripheral status of the host vehicle M. The target trajectory includes, for example, a speed element. For example, the target trajectory is expressed as a sequence of points (trajectory points) to be reached by the host vehicle M. The trajectory point is a point to be reached by the host vehicle M for each predetermined traveling distance (for example, about several [m]) along a road, and, separately, a target speed and a target acceleration for each predetermined sampling time (for example, about decimal point number [sec]) are generated as a part of the target trajectory. In addition, the trajectory point may be a position to be reached by the host vehicle M at a corresponding sampling time for each predetermined sampling time. In this case, information on the target speed and target acceleration is expressed by an interval between trajectory points.

The action plan generation unit 140 may set an event of automated driving when a target trajectory is generated. The event of automated driving includes a constant-speed traveling event, a low-speed following traveling event, a lane change event, a branching event, a merging event, and a takeover event. The action plan generation unit 140 generates a target trajectory according to an event to be started.

The mode decision unit 150 decides a driving mode of the host vehicle M between a plurality of driving modes with different tasks imposed on the driver. The mode decision unit 150 includes, for example, a deviation determination unit 152 and a margin calculation unit 154. These individual functions are will be described below.

FIG. 3 is a diagram which shows an example of correspondences among a driving mode, a control state of the host vehicle M, and a task. Driving modes of the vehicle M include, for example, five modes, from a mode A to a mode E. The control state, that is, a degree of automation of the driving control, of the host vehicle M is the highest in the mode A, decreases in the order of the mode B, the mode C, and the mode D, and is the lowest in the mode E. On the other hand, the task imposed on the driver is the lightest in the mode A, increases in the order of the mode B, the mode C, and the mode D, and is the heaviest in the mode E. Since the control state is not automated driving in the modes D and E, a responsibility of the automated driving control device 100 is to end control related to automated driving and to shift to driving assistance or manual driving. Content of each driving mode will be exemplified below.

In the mode A, the state is automated driving, and the driver is tasked neither with monitoring the front nor with gripping the steering wheel 82. However, even in the mode A, the driver is required to be in a posture that allows a quick shift to manual driving in response to a request from the system focusing on the automated driving control device 100. A term "automated driving" herein means that both the steering and the acceleration or deceleration are controlled without depending on an operation of the driver. The front is a space in the traveling direction of the host vehicle M visible through the front windshield. The mode A is, for example, a driving mode that can be executed when a condition is satisfied, such as that the host vehicle M is traveling at a predetermined speed (for example, about 50 [km/h]) or less on a dedicated road for automobiles such as a freeway and there is a preceding vehicle to follow, and it may also be referred to as Traffic Jam Pilot (TJP). The mode decision unit 150 changes the driving mode of the host vehicle M to the mode B when this condition is no longer satisfied.

In the mode B, the state is driving assistance, and the driver is tasked with monitoring the front of the host vehicle M (hereinafter referred to as forward monitoring), but is not tasked with gripping the steering wheel 82. In the mode C, the state is driving assistance, and the driver is tasked with forward monitoring and gripping the steering wheel 82. The mode D is a driving mode in which a certain amount of driving operation by the driver is required for at least one of steering and acceleration or deceleration of the host vehicle M. For example, in the mode D, driving assistance such as adaptive cruise control (ACC) and a lane keeping assist system (LKAS) is performed. In the mode E, the vehicle is in a manual operation state in which the driver needs to perform a driving operation for both steering and acceleration or deceleration. In both of the modes D and E, the driver is naturally tasked with monitoring the front of the host vehicle M.

The automated driving control device 100 (and a driving assistance device (not shown)) performs an automatic lane change depending on the driving mode. An automatic lane change includes an automatic lane change (1) by a system request and an automatic lane change (2) by a driver request. The automatic lane change (1) includes an automatic lane change for passing which is performed when a speed of a preceding vehicle is lower than a speed of a host vehicle by a reference or more, and an automatic lane change for traveling toward a destination (automatic lane change due to change of a recommended lane). The automatic lane change (2) involves causing the host vehicle M to change lanes in a direction of operation when a direction indicator is operated by the driver when conditions of a speed and a positional relationship with surrounding vehicles are satisfied.

The automated driving control device 100 executes neither of the automatic lane changes (1) and (2) in the mode A. In the modes B and C, the automated driving control device 100 executes both of the automatic lane changes (1) and (2). A driving assistance device (not shown) executes the automatic lane change (2) in the mode D without executing the automatic lane change (1). In the mode E, neither of the automatic lane changes (1) and (2) is executed.

The mode decision unit 150 changes the driving mode of the host vehicle M to a driving mode with a heavier task when a task related to the decided driving mode (hereinafter, a current driving mode) is not executed by the driver.

For example, in the mode A, when the driver is in a posture that does not allow a shift to manual driving in response to a request from the system (for example, when the driver continues to look aside outside an allowable area, or when a sign indicating difficulty in driving is detected), the mode decision unit 150 prompts the driver to shift to manual driving by using the HMI 30, and when the driver does not respond, control is performed such that the host vehicle M is gradually stopped while approaching a shoulder of a road, and automated driving is stopped. After the automatic driving is stopped, the host vehicle M is in a state of the mode D or E, and the host vehicle M can be started by a manual operation of the driver. In the following description, the same applies to "stopping automated driving." When the driver is not monitoring the front in the mode B, the mode decision unit 150 urges the driver to monitor the front by using the HMI 30, and performs control such that the host vehicle M is brought closer to the shoulder of a road and gradually stopped, and the automated driving is stopped if the driver does not respond. When the driver does not monitor the front or does not grip the steering wheel 82 in the mode C, the mode decision unit 150 urges the driver to monitor the front and/or to grip the steering wheel 82 by using the HMI 30, and performs control such that the host vehicle M is brought closer to the shoulder of a road and gradually stopped, and the automated driving is stopped if the driver does not respond.

The second control unit 160 controls the traveling drive force output device 200, the brake device 210, and the steering device 220 so that the host vehicle M passes through a target trajectory generated by the action plan generation unit 140 at a scheduled time.

Returning to FIG. 2, the second control unit 160 includes, for example, an acquisition unit 162, a speed control unit 164, and a steering control unit 166. The acquisition unit 162 acquires information on a target trajectory (trajectory points) generated by the action plan generation unit 140 and stores it in a memory (not shown). The speed control unit 164 controls the traveling drive force output device 200 or the brake device 210 based on a speed element associated with the target trajectory stored in the memory. The steering control unit 166 controls the steering device 220 according to a degree of bending of the target trajectory stored in the memory. Processing of the speed control unit 164 and the steering control unit 166 is realized by, for example, a combination of feedforward control and feedback control. As an example, the steering control unit 166 executes feedforward control according to a curvature of a road in front of the host vehicle M and feedback control based on a deviation from the target trajectory in combination.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic control unit (ECU) that controls these. The ECU controls the configuration described above according to information input from the second control unit 160 or information input from the driving operator 80.

The brake device 210 includes, for example, a brake caliper, a cylinder that transmits a hydraulic pressure to the brake caliper, an electric motor that generates the hydraulic pressure in the cylinder, and a brake ECU. The brake ECU controls the electric motor according to the information input from the second control unit 160 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the second control unit 160 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the second control unit 160 or the information input from the driving operator 80, and changes the direction of the steering wheel.

[Operation of Vehicle Control Device]

Figure 4:
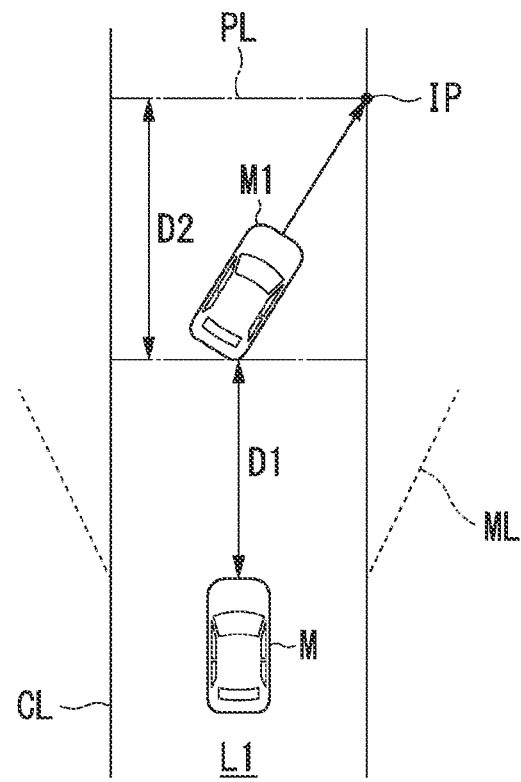
FIG. 4 is a diagram which shows an example of a situation in which an operation of the vehicle control device according to the embodiment is executed.

Next, an operation of the vehicle control device according to the embodiment will be described. FIG. 4 is a diagram which shows an example of a situation in which the operation of the vehicle control device according to the embodiment is executed. In FIG. 4, the host vehicle M is traveling in a lane L1, and the preceding vehicle M1 is traveling in front of the host vehicle M. While the host vehicle M is traveling in the lane L1, the recognition unit 130 recognizes the surrounding situation of the host vehicle M, particularly road division lines on both sides of the host vehicle M, on the basis of an image captured by the camera 10. Hereinafter, the road division lines recognized on the basis of the image captured by the camera 10 are represented by CL (hereinafter referred to as "camera road division line CL"), and road division lines recognized on the basis of the second map information 62 are represented by ML (hereinafter referred to as "map road division line ML"). In the following description, it is assumed that the host vehicle M is traveling in a driving mode of the mode B using the camera road division line CL (as a reference line).

The deviation determination unit 152 determines whether there is a deviation between the camera road division line CL and the map road division line ML. Here, a deviation means, for example, that a distance between the camera road division line CL and the map road division line ML is equal to or greater than a predetermined value, or that an angle formed between the camera road division line CL and the map road division line ML is equal to or greater than a predetermined value.

If the deviation determination unit 152 determines that there is a deviation between the camera road division line CL and the map road division line ML, then it determines whether the preceding vehicle M1 of the host vehicle M is present within the range of the camera road division line CL. In general, when the recognized camera road division line CL is correct, it is assumed that the preceding vehicle M1 travels within the range of the camera road division line CL, and thus it can be said that this determination processing is processing for confirming a reliability of the camera road division line CL. In the situation shown in FIG. 4, the deviation determination unit 152 determines that the vehicle is traveling within the range of the camera road division line CL.

The margin calculation unit 154 calculates a degree of margin for the host vehicle M to continue traveling in the driving mode of the mode B on the basis of a distance from the host vehicle M to the preceding vehicle M1, a distance from the preceding vehicle M1 to an intersection of the preceding vehicle M1 with the camera road division line CL, and the speed of the host vehicle M when it is determined that the preceding vehicle M1 is present within the range of the camera road division line CL.

More specifically, the margin calculation unit 154 first specifies an intersection point IP between an extending line of the trajectory of the preceding vehicle M1 and the camera road division line CL. The margin calculation unit 154 then calculates a degree of margin P according to P=(D1+D2)/V[sec] on the basis of a distance D1 from the host vehicle M to the preceding vehicle M1 and a distance D2 from the preceding vehicle M1 to a line PL (a line passing through the intersection point IP and perpendicular to the camera road division line CL), and a speed V of the host vehicle M. In other words, as the degree of margin P increases, it means that the preceding vehicle M1 is closer to traveling in parallel to the camera road division line CL, and the reliability of the camera road division line CL is higher. In other words, the degree of margin P is an example of the "degree of interference" between the camera road division line CL and the preceding vehicle M1. Alternatively, whether the camera road division line CL and the trajectory of the preceding vehicle M1 intersect with each other may be calculated as the degree of interference between the camera road division line CL and the preceding vehicle M1.

The deviation determination unit 152 then determines whether the calculated degree of margin P is equal to or greater than the first threshold value (that is, whether the degree of interference is equal to or less than the first threshold value). When it is determined that the calculated degree of margin P is less than the first threshold value, this means that the reliability of the camera road division line CL is relatively low. For this reason, the mode decision unit 150 changes the driving mode of the mode B using the camera road division line CL to the driving mode of the mode C using the camera road division line CL.

When the deviation determination unit 152 determines that the calculated degree of margin P is equal to or greater than the first threshold value, then it is determined whether a degree of the deviation between the camera road division line CL and the map road division line ML is within the second threshold value. Even if the preceding vehicle M1 is present within the range of the camera road division line CL and the degree of margin P is equal to or greater than the first threshold value, the preceding vehicle M1 may travel along a wrong camera road division line CL, and thus this determination processing is processing for more reliably evaluating the reliability of the camera road division line CL.

Figure 5:
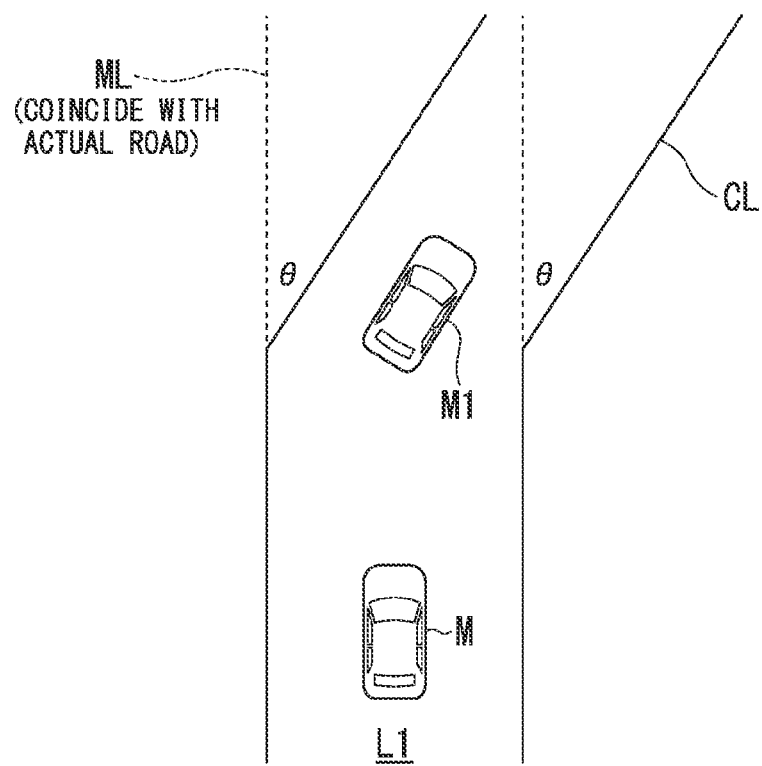
FIG. 5 is a diagram which shows an example of a situation in which a preceding vehicle travels along a wrong camera road division line.

FIG. 5 is a diagram which shows an example of a situation in which the preceding vehicle M1 travels along the wrong camera road division line CL. In FIG. 5, it is assumed that the map road division line ML coincides with an actual road. In the case of the situation shown in FIG. 5, because the preceding vehicle M1 is present within the range of the camera road division line CL and is traveling substantially in parallel to the camera road division line CL, the degree of margin P is calculated to be a value exceeding the first threshold value. However, since a traveling road of the camera road division line CL is actually different from the actual road, there is a problem in continuing the driving mode of the mode B by relying on the camera road division line CL.

For this reason, even if the preceding vehicle M1 is present within the range of the camera road division line CL and the degree of margin P is equal to or greater than the first threshold value, the deviation determination unit 152 then determines whether a deviation between the camera road division line CL and the map road division line ML is equal to or less than the second threshold value. The deviation determination unit 152 determines, for example, whether an angle θ between the camera road division line CL and the map road division line ML is equal to or less than the second threshold value.

When the deviation determination unit 152 determines that the deviation between the camera road division line CL and the map road division line ML is equal to or less than the second threshold value, the mode decision unit 150 continues the driving mode of the mode B using the camera road division line CL. On the other hand, when it is determined that the deviation between the camera road division line CL and the map road division line ML is greater than the second threshold value, the mode decision unit 150 changes the driving mode of the mode B using the camera road division line CL to the driving mode of the mode C using the camera road division line CL. In this manner, even if the preceding vehicle M1 is traveling along the wrong camera road division line CL, it is possible to evaluate the reliability of the camera road division line CL more reliably by verifying the deviation between the camera road division line CL and the map road division line ML.

Figure 6:
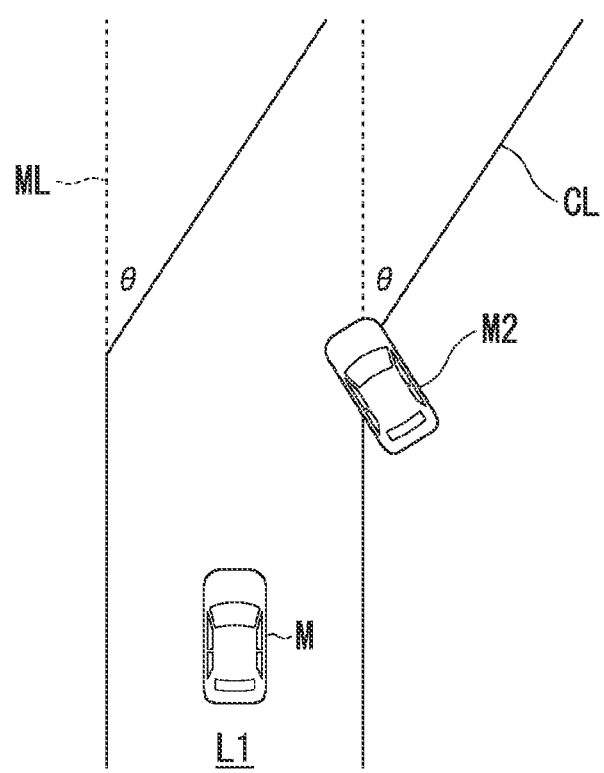
FIG. 6 is a diagram for describing processing executed when a deviation determination unit determines that a preceding vehicle is not present.

FIG. 6 is a diagram for describing processing executed when the deviation determination unit 152 determines that the preceding vehicle M1 is not present. When it is determined that the preceding vehicle M1 is not present within the range of the camera road division line CL, the deviation determination unit 152 then determines whether there are other vehicles crossing (cutting in) the camera road division line CL. This is, in general, because the reliability of the camera road division line CL tends to be relatively lowered due to interference from other vehicles when there are other vehicles crossing the camera road division line CL.

When the deviation determination unit 152 determines that there is no other vehicle crossing the camera road division line CL, this means that it is not clear which of the camera road division line CL and the map road division line ML where a deviation has occurred is more reliable. For this reason, the mode decision unit 150 changes the driving mode of the mode B using the camera road division line CL to the driving mode of the mode C using the camera road division line CL.

On the other hand, when it is determined that there are other vehicles crossing the camera road division line CL, the deviation determination unit 152 then determines whether a curvature change rate of the camera road division line CL is equal to or greater than a third threshold value. When it is determined that the curvature change rate of the camera road division line CL is equal to or greater than the third threshold value, this means that the reliability of the map road division line ML is higher than that of the camera road division line CL. For this reason, the mode decision unit 150 changes the driving mode of the mode B using the camera road division line CL to the driving mode of the mode B using the map road division line ML. On the other hand, when it is determined that the curvature change rate of the camera road division line CL is less than the third threshold value, this means that it is not clear which of the camera road division line CL and the map road division line ML is more reliable. For this reason, the mode decision unit 150 changes the driving mode of the mode B using the camera road division line CL to the driving mode of the mode C using the camera road division line CL.

Figure 7:
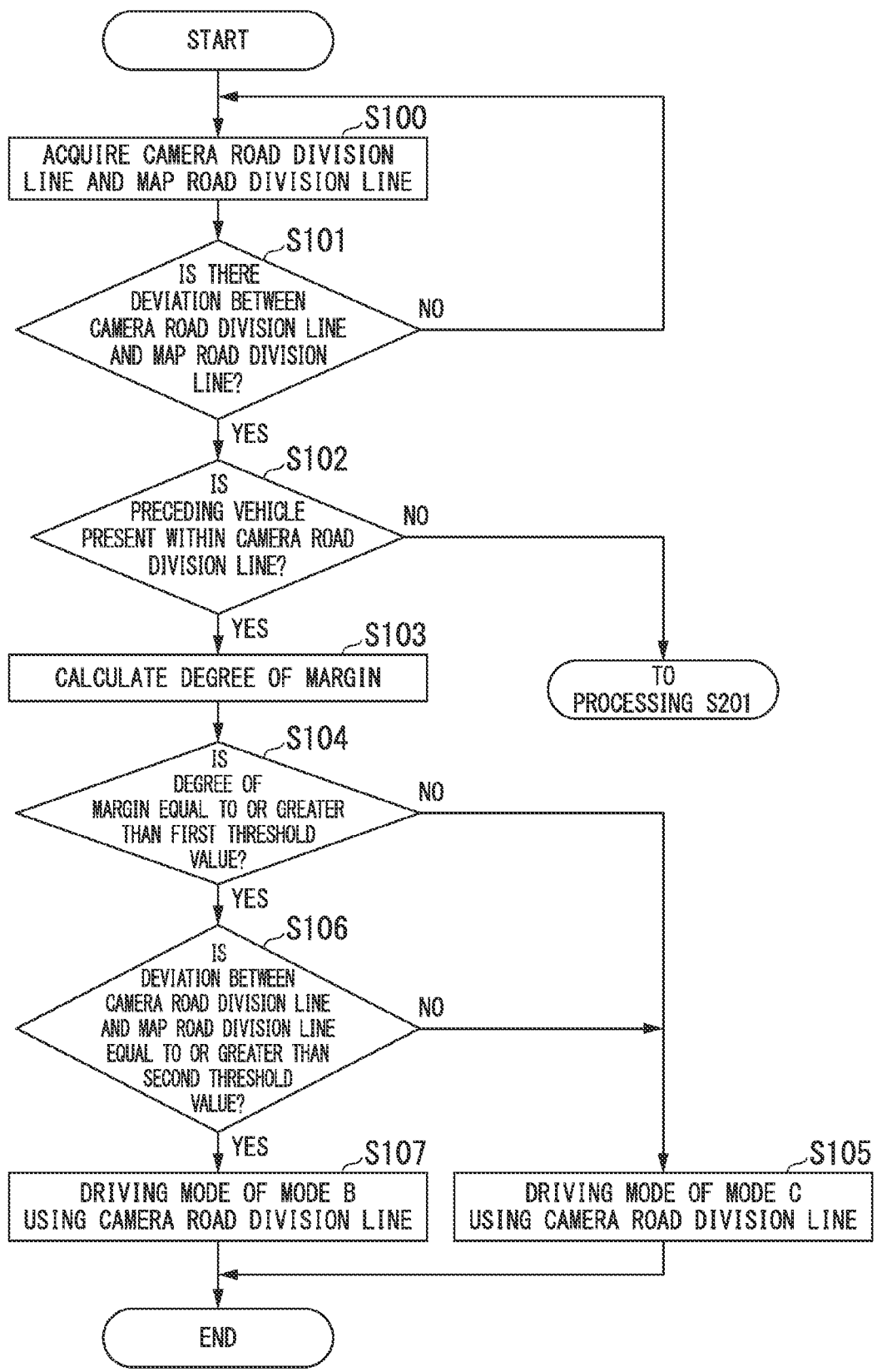
FIG. 7 is a flowchart which shows an example of a flow of operations executed by the vehicle control device according to the embodiment.

Next, a flow of operations executed by the vehicle control device according to the embodiment will be described with reference to FIGS. 7 and 8. FIG. 7 is a flowchart which shows an example of a flow of operations executed by the vehicle control device according to the embodiment. Processing according to the present flowchart is executed in a predetermined cycle while the host vehicle M is traveling in the driving mode of the mode B using the camera road division line CL.

First, the mode decision unit 150 acquires the camera road division line CL and the map road division line ML via the recognition unit 130 (step S100). Next, the deviation determination unit 152 determines whether there is a deviation between the acquired camera road division line CL and map road division line ML (step S101).

Next, when it is determined that there is a deviation between the acquired camera road division line CL and map road division line ML, the deviation determination unit 152 determines whether the preceding vehicle M1 is present within the range of the camera road division line CL (step S102). When it is determined that the preceding vehicle M1 is not present within the range of the camera road division line CL, the deviation determination unit 152 advances the processing to S201.

On the other hand, when it is determined that the preceding vehicle M1 is present within the range of the camera road division line CL, the margin calculation unit 154 calculates the degree of margin P on the basis of the distance from the host vehicle M to the preceding vehicle M1, the distance from the preceding vehicle M1 to an intersection of the preceding vehicle M1 with the camera road division line CL, and the speed of the host vehicle M (step S103). Next, the deviation determination unit 152 determines whether the calculated degree of margin P is equal to or greater than the first threshold value (step S104).

When it is determined that the calculated degree of margin P is less than the first threshold value, the mode decision unit 150 changes the driving mode of the mode B using camera road division line CL to the driving mode of the mode C using the camera road division line CL (step S105). On the other hand, when it is determined that the calculated degree of margin P is equal to or greater than the first threshold value, the deviation determination unit 152 next determines whether the deviation between the camera road division line CL and the map road division line ML is within the second threshold value (step S106). When it is determined that the deviation between the camera road division line CL and the map road division line ML is greater than the second threshold value, the mode decision unit 150 executes processing of step S105. On the other hand, when it is determined that the deviation between the camera road division line CL and the map road division line ML is equal to or less than the second threshold value, the mode decision unit 150 continues the driving mode of the mode B using the camera road division line CL (step S107). As a result, processing of the present flowchart ends.

FIG. 8 is a flowchart which shows an example of the flow of operations executed by the vehicle control device according to the embodiment. Processing of the flowchart shown in FIG. 8 is executed when it is determined in the processing of the flowchart shown in FIG. 7 that the preceding vehicle M1 is not present within the range of the camera road division line CL.

First, the deviation determination unit 152 determines whether there are other vehicles crossing the camera road division line CL (step S201). When it is determined that there are no other vehicles crossing the camera road division line CL, the mode decision unit 150 changes the driving mode of the mode B using the camera road division line CL to the driving mode of the mode C using the camera road division line CL (step S202). On the other hand, when it is determined that there are other vehicles crossing the camera road division line CL, the deviation determination unit 152 determines whether the curvature change rate of the camera road division line CL is equal to or greater than the third threshold value (step S203).

When it is determined that the curvature change rate of the camera road division line CL is less than the third threshold value, the mode decision unit 150 executes the processing of step S202. On the other hand, when it is determined that the curvature change rate of the camera road division line CL is equal to or greater than the third threshold value, the mode decision unit 150 converts the driving mode of the mode B using the camera road division line CL to the driving mode of the mode B using the map road division line ML (step S204). As a result, processing of this flowchart ends.

In the processing of the flowchart described above, when it is determined in step S102 that the preceding vehicle M1 is not present within the range of the camera road division line CL, then it is determined whether to execute the driving mode of the mode B using the map road division line ML or the driving mode of the mode C using the camera road division line CL on the basis of whether there are other vehicles crossing the camera road division line CL and the curvature change rate of the camera road division line CL. However, the present invention is not limited to such a configuration, and when the preceding vehicle M1 is not present, it may be determined that it is not clear which of the camera road division line CL and the map road division line ML is more reliable, and the driving mode may be changed to the mode C using the camera road division line CL.

According to the present embodiment described above, when a deviation occurs between a camera road division line and a map road division line and a preceding vehicle is present within a range of the camera road division line, a degree of interference between the preceding vehicle and the camera road division line is specified, and an automatic driving mode of a host vehicle is controlled according to the specified degree of interference. As a result, even when a road division line recognized by a camera differs from content of map information installed in the host vehicle, it is possible to flexibly change driving control of a vehicle.

The embodiments described above can be expressed as follows.

A vehicle control device includes a storage device that has stored a program, and a hardware processor, in which the hardware processor executes the program stored in the storage device, thereby acquiring a camera image obtained by capturing an image of a surrounding situation of a vehicle, controlling steering and acceleration or deceleration of the vehicle without depending on an operation of a driver of the vehicle on the basis of the camera image and map information, deciding a driving mode of the vehicle as any one of a plurality of driving modes including a first driving mode and a second driving mode, and changing the driving mode of the vehicle to a driving mode with a heavier task when a task related to the decided driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of a driver of the vehicle, determining whether there is a deviation between a road division line shown in the camera image and a road division line shown in the map information, determining whether a preceding vehicle is present in front of the vehicle when it is determined that there is a deviation, causing the vehicle to continue traveling in the second driving mode using the road division line shown in the camera image when it is determined that the preceding vehicle is present, and a degree of interference between the road division line shown in the camera image and the preceding vehicle is equal to or less than a first threshold value, and changing the second driving mode to the first driving mode using the road division line shown in the camera image when it is determined that the preceding vehicle is not present.

Although a mode for carrying out the present invention has been described above using the embodiment, the present invention is not limited to the embodiment, and various modifications and substitutions can be made within a range not departing from the gist of the present invention.

What is claimed is:

1. A vehicle control device comprising:
a storage medium configured to store a computer-readable instruction; and
a processor connected to the storage medium,
wherein the processor executes the computer-readable instruction, thereby
acquiring a camera image obtained by capturing an image of a surrounding situation of a vehicle,
controlling steering and acceleration or deceleration of the vehicle without depending on an operation of a driver of the vehicle on the basis of the camera image and map information,
deciding a driving mode of the vehicle as any one of a plurality of driving modes including a first driving mode and a second driving mode, and changing the driving mode of the vehicle to a driving mode with a heavier task when a task related to the decided driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of a driver of the vehicle,
determining whether there is a deviation between a road division line shown in the camera image and a road division line shown in the map information, and determining whether a preceding vehicle is present in front of the vehicle when it is determined that there is a deviation,
causing the vehicle to continue traveling in the second driving mode using the road division line shown in the camera image when it is determined that the preceding vehicle is present, and a degree of interference between a road division line shown in the camera image and the preceding vehicle is equal to or less than a first threshold value, and changing the second driving mode to the first driving mode using the road division line shown in the camera image when it is determined that the preceding vehicle is not present.

2. The vehicle control device according to claim 1, wherein the processor calculates a degree of margin for the vehicle to continue traveling in the second driving mode as the degree of interference on the basis of a distance from the vehicle to the preceding vehicle, a distance from the preceding vehicle to an intersection of the preceding vehicle with a road division line shown in the camera image, and a speed of the vehicle.

3. The vehicle control device according to claim 1, wherein the processor determines whether a deviation between a road division line shown in the camera image and a road division line shown in the map information is equal to or less than a second threshold value when it is determined that the preceding vehicle is present and the degree of interference is equal to or less than the first threshold value, and the processor changes the second driving mode using a road division line shown in the camera image to the first driving mode using a road division line shown in the camera image when it is determined that the deviation is greater than the second threshold value.

4. The vehicle control device according to claim 1, wherein the processor changes the second driving mode using a road division line shown in the camera image to the first driving mode using a road division line shown in the camera image when it is determined that the preceding vehicle is present and the degree of interference is greater than the first threshold value.

5. The vehicle control device according to claim 1, wherein the processor determines whether there are other vehicles crossing a road division line shown in the camera image when it is determined that the preceding vehicle is not present, and determines whether a curvature change rate of a road division line shown in the camera image is equal to or greater than a third threshold value when it is determined that there are other vehicles, and the processor changes the second driving mode using a road division line shown in the camera image to the second driving mode using a road division line shown in the map information when it is determined that the curvature change rate is equal to or greater than the third threshold value.

6. The vehicle control device according to claim 1, wherein the second driving mode is a driving mode in which a task of gripping an operator for receiving a steering operation of the vehicle is not imposed on the driver, and the first driving mode is a driving mode in which at least only the task of gripping the operator is imposed on the driver.

7. A vehicle control method comprising:

by a computer, acquiring a camera image obtained by capturing an image of a surrounding situation of a vehicle;

controlling steering and acceleration or deceleration of the vehicle without depending on an operation of a driver of the vehicle on the basis of the camera image and map information;

deciding a driving mode of the vehicle as any one of a plurality of driving modes including a first driving mode and a second driving mode, and changing the driving mode of the vehicle to a driving mode with a heavier task when a task related to the decided driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of a driver of the vehicle;

determining whether there is a deviation between a road division line shown in the camera image and a road division line shown in the map information, and determining whether a preceding vehicle is present in front of the vehicle when it is determined that there is a deviation; and causing the vehicle to continue traveling in the second driving mode using the road division line shown in the camera image when it is determined that the preceding vehicle is present, and a degree of interference between a road division line shown in the camera image and the preceding vehicle is equal to or less than a first threshold value, and changing the second driving mode to the first driving mode using the road division line shown in the camera image when it is determined that the preceding vehicle is not present.

8. A non-transitory computer-readable medium storing a program for causing a computer to execute:

acquiring a camera image obtained by capturing an image of a surrounding situation of a vehicle;

controlling steering and acceleration or deceleration of the vehicle without depending on an operation of a driver of the vehicle on the basis of the camera image and map information;

deciding a driving mode of the vehicle as any one of a plurality of driving modes including a first driving mode and a second driving mode, and changing the driving mode of the vehicle to a driving mode with a heavier task when a task related to the decided driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of a driver of the vehicle;

determining whether there is a deviation between a road division line shown in the camera image and a road division line shown in the map information, and determining whether a preceding vehicle is present in front of the vehicle when it is determined that there is a deviation; and causing the vehicle to continue traveling in the second driving mode using the road division line shown in the camera image when it is determined that the preceding vehicle is present, and a degree of interference between a road division line shown in the camera image and the preceding vehicle is equal to or less than a first threshold value, and changing the second driving mode to the first driving mode using the road division line shown in the camera image when it is determined that the preceding vehicle is not present.

* * * * *